United States Patent Office 3,337,598
Patented Aug. 22, 1967

3,337,598
2-METHYL-2-PHENYL-1,3-DIOXA-2-SILA-CYCLOHEPT-5-ENE
George B. Sterling, Midland, and Chester E. Pawloski, Bay City, Mich., assignors to The Dow Chemical Company, Midland, Mich., a corporation of Delaware
No Drawing. Filed Mar. 5, 1962, Ser. No. 177,193
1 Claim. (Cl. 260—448.8)

The present invention is directed to 2-methyl-2-phenyl-1,3-dioxa-2-sila-cyclohept-5-ene having the formula:

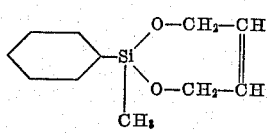

This compound is a liquid material which is somewhat soluble in many common organic solvents and of low solubility in water. It is useful as a parasiticide for the control of insects, worms and bacterial and fungal organisms such as cockroaches, flies and trichostrongylids. It is also useful in the manufacture of improved latex polymers and vinyl rubber products such as copolymers with butadiene. The latexes and vinyl rubber products are found to have very desirable and improved tensile, lubricous, soft, and elastic properties.

The new compound is prepared by reacting 2-butene-1,4-diol with a methyl phenyl dialkoxy silane corresponding to the formula:

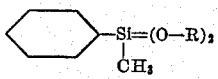

wherein R represents lower alkyl. The reaction is carried out in the presence of a small and catalytic amount of an acidic catalyst such as sulfuric acid, trichloroacetic acid, phosphoric acid, dichloropropionic acid and the like. Good results are obtained when employing about equimolecular proportions of the butenediol and methyl phenyl dialkoxy silane product. The reaction conveniently is carried out in an organic liquid as reaction medium and takes place readily at temperatures of from 10° to 100° C. In carrying out the reaction, the butenediol and silane ether are mixed together with a catalytic amount of the acid catalyst and the reaction mixture maintained for a short period in the reaction temperature range. Upon completion of the reaction, the reaction mixture is fractionally distilled under reduced pressure to obtain the desired product as a liquid material.

In a representative operation, 30 grams (0.33 mole) of 2-butene-1,4-diol, 60 grams (0.33 mole) of methyl phenyl dimethoxy silane and two drops of concentrated sulfuric acid were mixed together with stirring at room temperature. During the stirring, a reaction took place resulting in the formation of a single liquid phase. The reaction mixture was thereafter distilled at a 3:1 reflux ratio until the pot temperature reached 115° C. after which it was allowed to cool. A small amount of sodium carbonate was then added to the mixture and the distillation completed under vacuum to obtain a 2-methyl-2-phenyl-1,3-dioxa-2-sila-cyclohept-5-ene product as a liquid material boiling at 100° C. at 1.3 millimeters pressure and having a refractive index $n/D$ of 1.5348 at 25° C.

The new compound of the present invention has been found to be useful as a parasiticide and as constituents in latex polymers and vinyl rubber products. For parasiticidal use, the product is dispersed on a finely divided solid and employed as a dust. Also, such mixtures may be dispersed in water with the aid of a wetting agent and the resulting aqueous suspensions employed as sprays. In other procedures, the product is employed as a constituent of solvent solutions, oil-in-water or water-in-oil emulsion or water dispersion with or without the addition of wetting, dispersing and emulsifying agents. In a representative operation, aqueous compositions containing 2,000 parts per million by weight of 2-methyl-2-phenyl-1,3-dioxa-2-sila-cyclohept-5-ene give substantially complete kills of cockroaches.

What is claimed is:
2-methyl-2-phenyl-1,3-dioxa-2-sila-cyclohept-5-ene.

References Cited

UNITED STATES PATENTS

| | | | |
|---|---|---|---|
| 2,386,793 | 10/1945 | Hanford | 260—448.8 |
| 2,441,066 | 5/1948 | Hanford | 260—448.8 |
| 2,876,209 | 3/1959 | De Benneville et al. | 260—448.8 |
| 3,065,254 | 11/1962 | Silva | 260—448.8 |
| 3,256,308 | 6/1966 | Sterling et al. | 260—448.8 |

FOREIGN PATENTS 791,169  2/1958  Great Britain.

OTHER REFERENCES

Krieble et al., "Jour. American Chem. Soc.," vol. 69, November 1947, pp. 2689–92.

Staudinger et al., "Makromolekulare Chemie," vol. 11, October 1953, pp. 24–50, pp. 24, 30–31 and 41–44 only needed.

TOBIAS E. LEVOW, *Primary Examiner.*

SAMUEL H. BLECH, *Examiner.*

P. D. FREEDMAN, J. G. LEVITT, P. F. SHAVER,
*Assistant Examiners.*